US012756926B2

(12) United States Patent
Wang

(10) Patent No.: US 12,756,926 B2
(45) Date of Patent: Oct. 6, 2026

(54) AREA ADJUSTMENT METHODS AND APPARATUSES, CAMERAS AND STORAGE MEDIA

(71) Applicant: BOE Technology Group Co., Ltd., Beijing (CN)

(72) Inventor: Zhen Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 288 days.

(21) Appl. No.: 18/579,881

(22) PCT Filed: Sep. 21, 2022

(86) PCT No.: PCT/CN2022/120062
§ 371 (c)(1),
(2) Date: Jan. 17, 2024

(87) PCT Pub. No.: WO2023/087894
PCT Pub. Date: May 25, 2023

(65) Prior Publication Data
US 2024/0397198 A1 Nov. 28, 2024

(30) Foreign Application Priority Data
Nov. 18, 2021 (CN) ......................... 202111372000.0

(51) Int. Cl.
*H04N 23/63* (2023.01)
*H04N 7/18* (2006.01)
*H04N 23/661* (2023.01)

(52) U.S. Cl.
CPC ............. *H04N 23/635* (2023.01); *H04N 7/18* (2013.01); *H04N 23/661* (2023.01)

(58) Field of Classification Search
CPC ...... H04N 23/635; H04N 7/18; H04N 23/661; H04N 23/60
See application file for complete search history.

(56) References Cited

U.S. PATENT DOCUMENTS

2003/0227555 A1* 12/2003 Kobayashi ....... G08B 13/19686 348/231.6
2005/0275723 A1* 12/2005 Sablak .................. G06V 10/25 348/169
(Continued)

FOREIGN PATENT DOCUMENTS

CN 105550670 A 5/2016
CN 106815868 A 6/2017
(Continued)

OTHER PUBLICATIONS

PCT/CN2022/120062 international search report dated Nov. 29, 2022.
(Continued)

*Primary Examiner* — Timothy J Henn
(74) *Attorney, Agent, or Firm* — IPro, PLLC

(57) ABSTRACT

The present disclosure relates to an area adjustment method and apparatus, a camera and a storage medium. The method includes: in response to detecting that a camera rotates, obtaining a rotation angle variation of the camera; according to the rotation angle variation, obtaining a transformation relationship between a world coordinate system and a pixel coordinate system corresponding to the camera; according to world coordinate data of a preset area and the transformation relationship, determining pixel coordinate data of the preset area in a current image; where the preset area indicates an area preset in a preview image before the camera rotates. In the embodiment, the preset area in the preview image does not change along with the rotation of the camera. Thus, no false identifications and false alarms will be generated during a process of identifying an object in the preset area subsequently, helping improve the identification efficiency and the use experiences.

12 Claims, 5 Drawing Sheets

(56) References Cited

U.S. PATENT DOCUMENTS

| | | | | |
|---|---|---|---|---|
| 2016/0153801 | A1* | 6/2016 | Cho | G06T 11/60 701/431 |
| 2019/0291277 | A1 | 9/2019 | Oleynik | |
| 2022/0084246 | A1 | 3/2022 | Dai | |
| 2023/0135750 | A1* | 5/2023 | Spoerri | G06T 15/205 705/319 |

FOREIGN PATENT DOCUMENTS

| | | | | | |
|---|---|---|---|---|---|
| CN | 107798918 | A | | 3/2018 | |
| CN | 108627092 | A | | 10/2018 | |
| CN | 109118545 | A | | 1/2019 | |
| CN | 111199560 | A | | 5/2020 | |
| CN | 111461994 | A | * | 7/2020 | G01S 19/42 |
| CN | 112232279 | A | | 1/2021 | |
| CN | 112631482 | A | | 4/2021 | |
| CN | 112818990 | A | | 5/2021 | |
| CN | 113329181 | A | | 8/2021 | |
| CN | 113923420 | A | | 1/2022 | |
| JP | 2001264037 | A | | 9/2001 | |
| KR | 20160146567 | A | | 12/2016 | |
| WO | 2020239093 | A1 | | 12/2020 | |
| WO | WO-2021106436 | A1 | * | 6/2021 | G06T 11/203 |

OTHER PUBLICATIONS

PCT/CN2022/120062 Written Opinion dated Nov. 29, 2022.

CN2021113720000 first office action dated Sep. 25, 2023.

Xianyubantiao. “The relationship between the world coordinate system, camera coordinate system, and image coordinate system.” retrieved from https://blog.csdn.net/wgx571859177/article/details/79564522. Mar. 15, 2018. 21 pages.

Little hum. “The relationship between world, camera, image, and pixel coordinate systems.” retrieved from https://zhuanlan.zhihu.com/p/179933911. Aug. 11, 2020. 9 pages.

Qing~. “Camera calibration: Analysis of the conversion process from world coordinate system to image pixel coordinate system.” retrieved from https://www.pianshen.com/article/4801379140/. May 5, 2019. 11 pages.

East_fence. “Smart car competition reverse perspective transformation (including programming implementation).” retrieved from https://blog.csdn.net/east_fence/article/details/106953970. Jun. 25, 2020. 14 pages.

Javastart “Detailed explanation of the OpenCV perspective transformation principle and examples.” retrieved from, https://blog.csdn.net/javastart/article/details/104332463. Feb. 15, 2020. 9 pages.

* cited by examiner

AREA ADJUSTMENT METHODS AND APPARATUSES, CAMERAS AND STORAGE MEDIA

CROSS-REFERENCE TO RELATED APPLICATIONS

This application is a national stage of international PCT Application No. PCT/CN2022/120062 filed on Sep. 21, 2022, which claims priority to Chinese patent application No. 202111372000.0 filed on Nov. 18, 2021, the entire contents of which are incorporated herein by reference.

TECHNICAL FIELD

The present disclosure relates to the field of data processing technologies, and in particular to an area adjustment method and apparatus, a camera and a storage medium.

BACKGROUND

Along with rapid development of security technologies, security systems are disposed in many key areas. Cameras in the security systems can perform monitoring for the security areas 24/7 by collecting and recording videos. Furthermore, the existing security systems also allow users to plan an area A as a restricted area in a video picture through a webpage end and focus monitoring on the restricted area.

SUMMARY

The present disclosure provides an area adjustment method and apparatus, a camera and a storage medium, so as to solve the shortcomings in the related arts.

According to a first aspect of embodiments of the present disclosure, there is provided an area adjustment method, including:

in response to detecting that a camera rotates, obtaining a rotation angle variation of the camera;

according to the rotation angle variation, obtaining a transformation relationship between a world coordinate system and a pixel coordinate system corresponding to the camera;

according to world coordinate data of a preset area and the transformation relationship, determining pixel coordinate data of the preset area in a current image: where the preset area indicates an area preset in a preview image before the camera rotates.

In some embodiments, according to the rotation angle variation, obtaining the transformation relationship between the world coordinate system and the pixel coordinate system corresponding to the camera includes:

obtaining a camera coordinate system corresponding to the camera according to the rotation angle variation;

obtaining the transformation relationship between the world coordinate system and the pixel coordinate system corresponding to the camera according to the camera coordinate system.

In some embodiments, the method further includes:

obtaining the world coordinate data of the preset area, so as to obtain the pixel coordinate data according to the world coordinate data.

In some embodiments, obtaining the world coordinate data of the preset area includes:

obtaining at least one specified point in the preview image;

based on the at least one specified point, obtaining the world coordinate data of the preset area.

In some embodiments, in response to determining that the at least one specified point is an origin of the world coordinate system, obtaining the world coordinate data of the preset area based on the at least one specified point includes:

establishing the world coordinate system with a projection of the camera onto a horizontal plane as the origin, and obtaining the world coordinate data corresponding to each pixel point in the preset area, so as to obtain the world coordinate data of the preset area.

In some embodiments, in response to determining that the at least one specified point is a first number of specified points in the preview image, obtaining the world coordinate data of the preset area based on the at least one specified point includes:

obtaining the world coordinate data corresponding to the first number of specified points in the preview image;

according to pixel coordinate data of the first number of specified points and the world coordinate data corresponding to the first number of specified points, determining the transformation relationship between the world coordinate system and the pixel coordinate system corresponding to the camera;

according to the pixel coordinate data of the preset area and the transformation relationship, calculating the world coordinate data of the preset area.

In some embodiments, obtaining the world coordinate data of the preset area includes:

obtaining current data of a specified parameter of the camera and the pixel coordinate data of the preset area: where the specified parameter includes at least one of: a pitch angle, a focal length, a size of a photosensitive device or a height;

based on a preset transformation relationship between the pixel coordinate system and the world coordinate system, calculating the world coordinate data of the preset area in combination with the current data, the pixel coordinate data and the transformation relationship.

In some embodiments, obtaining the world coordinate data of the preset area includes:

with an origin of the world coordinate system as a reference point, obtaining three-dimensional point cloud data of an area where the camera is located;

based on the three-dimensional point cloud data, obtaining the world coordinate data corresponding to each pixel point in the preset area.

In some embodiments, the method further includes:

sending the pixel coordinate data of the preset area in the current image to a webpage configuration end, such that the webpage configuration end updates the pixel coordinate data of the preset area.

According to a second aspect of embodiments of the present disclosure, there is provided an area adjustment apparatus, including:

a rotation angle variation obtaining module, configured to, in response to detecting that a camera rotates, obtain a rotation angle variation of the camera;

a transformation relationship obtaining module, configured to, according to the rotation angle variation, obtain a transformation relationship between a world coordinate system and a pixel coordinate system corresponding to the camera;

a pixel coordinate determining module, configured to, according to world coordinate data of a preset area and the transformation relationship, determine pixel coordinate data of the preset area in a current image: where the preset area indicates an area preset in a preview image before the camera rotates.

According to a third aspect of embodiments of the present disclosure, there is provided a camera, including:

a processor;

a memory, configured to store a computer program executable by the processor;

where the processor is configured to execute the computer program in the memory to perform the above method.

According to a fourth aspect of embodiments of the present disclosure, there is provided a security system, including at least one camera and a server, where the camera is configured to collect and send an image to the server; and the server includes:

a processor;

a memory, configured to store a computer program executable by the processor;

where the processor is configured to execute the computer program in the memory to perform the above method.

According to a fifth aspect of embodiments of the present disclosure, there is provided a computer readable storage medium, where an executable computer program in the storage medium is executed by a processor to perform the above method.

The technical solutions provided by the embodiments of the present disclosure have the following beneficial effects.

As known from the above embodiments, in the solutions provided by the embodiments of the present disclosure, after it is detected that a camera rotates, a rotation angle variation of the camera is obtained: then, according to the rotation angle variation, a transformation relationship between a world coordinate system and a pixel coordinate system corresponding to the camera is obtained: next, according to world coordinate data of a preset area and the transformation relationship, pixel coordinate data of the preset area in the current picture is determined, where the preset area is an area preset in a preview image before the camera rotates. In this case, in the present embodiment, the preset area in the preview image does not change along with the rotation of the camera. Thus, no false identifications and false alarms will be generated during a process of identifying an object in the preset area subsequently, helping improve the identification efficiency and the use experiences.

It should be understood that the above general descriptions and subsequent detailed descriptions are only illustrative and explanatory rather than limiting of the present disclosure.

BRIEF DESCRIPTION OF DRAWINGS

The accompanying drawings herein incorporated into and constitute a part of the specification illustrates embodiments consistent with the present disclosure and serves to explain the principle of the present disclosure together with the specification.

DETAILED DESCRIPTION

Figure 1:
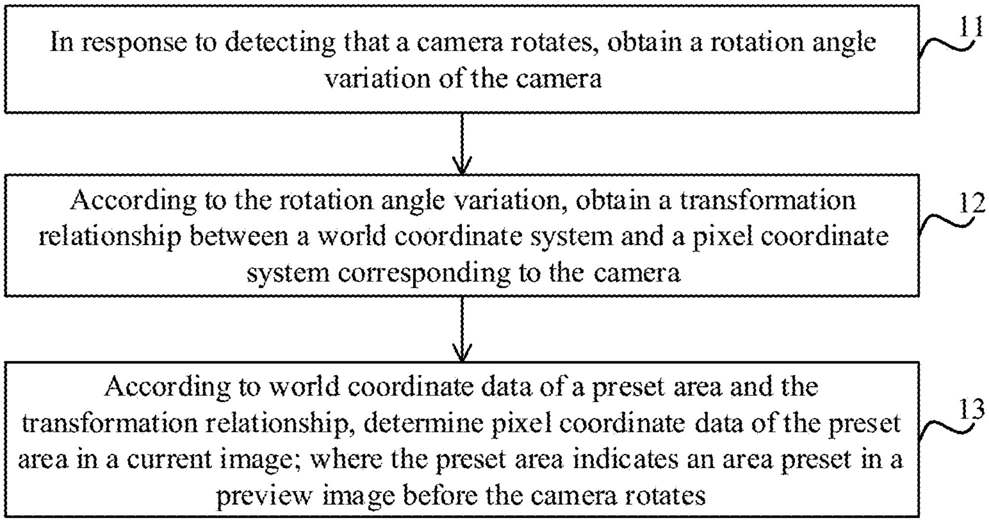
FIG. 1 is a flowchart illustrating an area adjustment method according to an exemplary embodiment of the present disclosure.

Exemplary embodiments will be described in detail herein, with the illustrations thereof represented in the drawings. When the following descriptions involve the drawings, the elements with like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims. It is noted that in case of no conflicts, the following embodiments and the features in the embodiments can be mutually combined.

In practical applications, when a restricted area or the like is disposed in a preview area, a user usually adjusts an orientation of a camera to monitor security situations of different areas. When the orientation of the camera is changed, the above restricted area will synchronously change, namely, the coverage scope of the restricted area changes from an area A to an area B. In this case, the camera can identify a target object in the area B and give an alarm. But, the area B is not the area A that is expected to be monitored, which results in false alarm and worsens the use experiences.

To solve the above technical problem, an embodiment of the present disclosure provides an area adjustment method, which may be applied to a security system. In an example, the security system includes at least one camera and at least one configuration terminal. In another example, the security system includes at least one camera, a server, and at least one configuration terminal. The configuration terminal may serve as a webpage configuration end to perform corresponding configuration on any camera, for example, set a preset area involved in subsequent embodiments. The server may be configured to acquire images (i.e. pictures or videos) collected by the camera and distribute them to each configuration terminal for displaying. In an example, the camera may also distribute the collected images to each configuration terminal for displaying when the camera is configured with processing resources. In other words, both the camera and the server in the present disclosure can perform an area adjustment method and may be set based on actual scenarios. In subsequent embodiments, the technical solutions of the embodiments will be described with an example in which the camera only collects images and uploads the images to the server and the server performs an area adjustment method.

FIG. 1 is a flowchart illustrating an area adjustment method according to an exemplary embodiment of the present disclosure. As shown in FIG. 1, the area adjustment method includes steps 11 to 13.

At step 11, in response to detecting that a camera rotates, a rotation angle variation of the camera is obtained.

In the present embodiment, the server may communicate with any camera in a security system in a wired or wireless manner. The wireless manner, for example, includes but not limited to Bluetooth, WiFi, Zigbee or the like. The server may, in the above communication manner, obtain the images collected by the camera and/or obtain a specified parameter of the camera. The specific parameter may include at least one of: a pitch angle, a focal length, a size of a photosensitive device or a height, which may be set based on actual scenarios and will not be limited herein.

In the present embodiment, when a user is to adjust an angle of the camera, the user may configure the angle through a configuration terminal (for example, fill out an adjustment angle at a webpage end), or the user may adjust the angle by pressing a press key or toggling an angle adjustment rod. In this case, the configuration terminal may send an angle adjustment request to the server. The above adjustment request may include an angle adjustment relative amount which refers to an offset amount by which the camera is adjusted from a current angle to a target angle. The above adjustment request may further include at least one angle adjustment request, each of which can cause the server to adjust the angle based on a set step length. Upon receiving the angle adjustment request, the server may, in response to the angle adjustment request, send a control instruction to the camera to adjust the camera to the target angle. When a set time length (e.g. 2-2 seconds) elapses from the last adjustment request, the server may determine that the angle adjustment for the camera is completed, namely, the camera has been rotated.

In the present embodiment, in response to detecting the rotation of the camera, the server may obtain angle data from the configuration data so as to obtain the rotation angle variation before and after the adjustment. Alternatively, the server may calculate a number of the received angle adjustment requests and calculate a product of the above number and the set step length (i.e. the angle variation corresponding to each angle adjustment request) to obtain the rotation angle variation.

In an embodiment, after receiving the angle adjustment request, the server may send a control instruction to the camera, and if the server does not receive the angle adjustment request, the server will no longer send the control instruction. After it is detected that the last control instruction is sent (i.e. no angle adjustment request is received within a set time length), an angle parameter obtaining request may be sent to the camera. After receiving the angle parameter obtaining request, the camera may return the rotation angle variation corresponding to this angle adjustment. In practical applications, the camera may further return other angle data, for example, a pre-adjustment angle, a post-adjustment angle or the like, which may be set based on specific scenarios. The corresponding solution falls within the scope of protection of the present disclosure.

At step 12, according to the rotation angle variation, a transformation relationship between a world coordinate system and a pixel coordinate system corresponding to the camera is obtained.

In the present embodiment, the server may pre-store the transformation relationship between the world coordinate system and the pixel coordinate system corresponding to the camera. The pixel coordinate system refers to a coordinate system with a vertex of an image as a coordinate origin, a direction of the image width as a direction of X axis and a direction of the image height as a direction of Y axis. Further, each piece of coordinate data in the pixel coordinate system is a coordinate of a particular pixel in the entire image, expressed in the unit of pixels. The world coordinate system refers to an absolute coordinate system in the objective three-dimensional world to describe positions of the camera and a photographed object. In an example, with a projection of the camera onto a horizontal plane as the coordinate origin, the horizontal plane as a XOY plane and a direction perpendicular to the horizontal plane as a direction of Z axis, the world coordinate system is established.

In the present embodiment, the transformation relationship between the pixel coordinate system and the world coordinate system may be obtained in the following manner.

1. A transformation relationship between the world coordinate system and a camera coordinate system is obtained.

The camera coordinate system refers to a coordinate system with an optical center as a coordinate origin, Xc axis and Yc axis respectively parallel to the X axis and Y axis of the image and Zc axis parallel to an optical axis. The transformation between the camera coordinate system and the world coordinate system may be implemented by rigid body transformation. In a three-dimensional space, when an object does not deform, rotation and/or translation movement performed on the object is called rigid body transformation. Since the world coordinate system and the camera coordinate system both are right-handed coordinate systems, no deformation occurs during rigid body transformation, with the transformation formula shown in the formula (1):

$$X_c = RW + T. \tag{1}$$

where Xc refers to the camera coordinate system, W refers to the world coordinate system, R refers to a rotation matrix between two coordinate systems, and T refers to a translation matrix between two coordinate systems.

Figure 2:
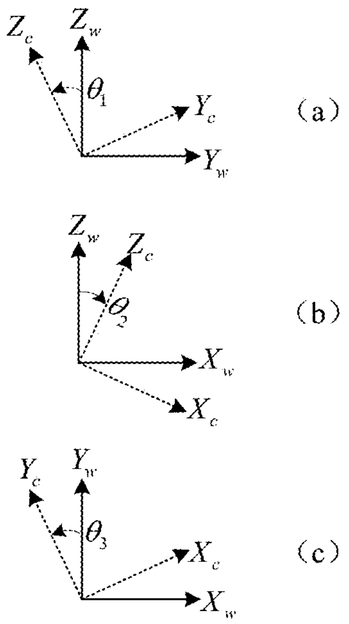
FIG. 2 is schematic diagrams illustrating an effect of rotation around x, y and z axes according to an exemplary embodiment of the present disclosure, where FIG. (a) is a schematic diagram illustrating an effect of rotation around the x axis, FIG. (b) is a schematic diagram illustrating an effect of rotation around the y axis, and FIG. (c) is a schematic diagram illustrating an effect of rotation around the z axis.

The rotation matrix R is a 3*3 matrix which is also called Euler rotation matrix, and in other words, means that the world coordinate system is rotatable in the Xc, Yc and Zc directions of the camera coordinate system. By referring FIG. 2, the Euler rotation matrix may be split into rotations around three coordinate axes Xc, Yc and Zc, with the transformation formulas shown in the formulas (2), (3) and (4).

$$\begin{bmatrix} X_c \\ Y_c \\ Z_c \end{bmatrix} = \begin{bmatrix} 1 & 0 & 0 \\ 0 & \cos\theta_1 & \sin\theta_1 \\ 0 & \sin\theta_1 & \cos\theta_1 \end{bmatrix} \begin{bmatrix} X_w \\ Y_w \\ Z_w \end{bmatrix} \quad (2)$$

$$\begin{bmatrix} X_c \\ Y_c \\ Z_c \end{bmatrix} = \begin{bmatrix} \cos\theta_2 & 0 & \sin\theta_2 \\ 0 & 1 & 0 \\ \sin\theta_2 & 0 & \cos\theta_2 \end{bmatrix} \begin{bmatrix} X_w \\ Y_w \\ Z_w \end{bmatrix} \quad (3)$$

$$\begin{bmatrix} X_c \\ Y_c \\ Z_c \end{bmatrix} = \begin{bmatrix} \cos\theta_3 & \sin\theta_3 & 0 \\ -\sin\theta_3 & \cos\theta_3 & 0 \\ 0 & 0 & 1 \end{bmatrix} \begin{bmatrix} X_w \\ Y_w \\ Z_w \end{bmatrix} \quad (4)$$

Therefore, R is a product of the parameter matrices (i.e. intermediate matrix in each formula) in the formulas (2), (3) and (4), which is controlled by θ of three directions (i.e. θ1, θ2 and θ3), and thus have three degrees of freedom.

2. A transformation relationship between the camera coordinate system and an image coordinate system is obtained.

The image coordinate system is a coordinate system with an intersection point of a primary optical axis and an image plane as a coordinate origin, and directions respectively parallel to the image width and height as directions of X axis and Y axis. Furthermore, each piece of coordinate data in the image coordinate system is a coordinate of the image on a photosensitive device of the camera.

Figure 3:
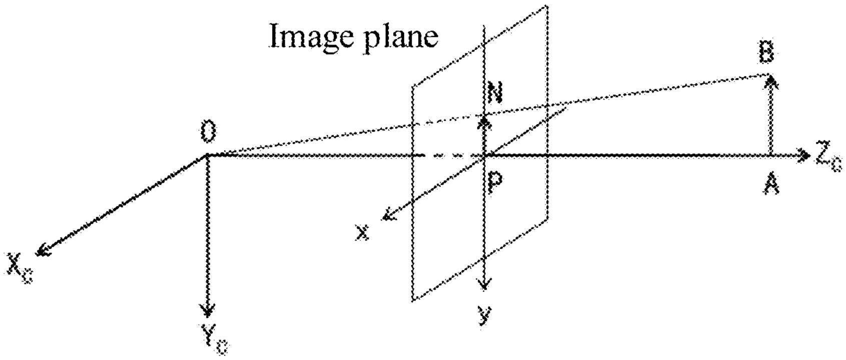
FIG. 3 is a schematic diagram illustrating an effect of an imaging relationship under a camera coordinate system according to an exemplary embodiment of the present disclosure.

In the present step, an imaging relationship under the camera coordinate system is established based on a pinhole model with the effect shown in FIG. 3. As shown in FIG. 3, since the triangle OPN and the triangle OAB are similar triangles, it can be known from the geometric relationship of similar triangles that NP/OP-AB/OA, and thus the transformation relationship between the image coordinate system and the camera coordinate system is obtained, with the transformation formula shown in the formula (5):

$$\begin{bmatrix} x \\ y \\ 1 \end{bmatrix}_I = \begin{Bmatrix} \frac{f_x X_c}{Z_c} \\ \frac{f_y Y_c}{Z_c} \\ 1 \end{Bmatrix} = \frac{1}{Z_c} \begin{bmatrix} f_x & 0 & 0 \\ 0 & f_y & 0 \\ 0 & 0 & 1 \end{bmatrix} \begin{bmatrix} X \\ Y \\ Z \end{bmatrix}_C . \quad (5)$$

In the formula (5), fy is a focal length OP of the camera on the Y axis, and fx is a focal length of the camera on the X axis.

3. A transformation relationship between the pixel coordinate system and the image coordinate system is obtained.

Figure 4:
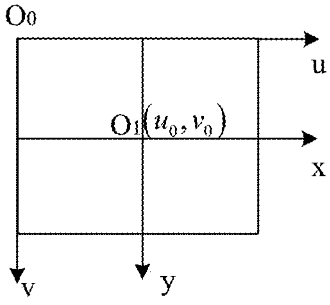
FIG. 4 is a schematic diagram illustrating a transformation relationship between a pixel coordinate system and an image coordinate system according to an exemplary embodiment of the present disclosure.

In the present step, the pixel coordinate system is a coordinate system with a vertex of the image as a coordinate origin, a direction of the image width as a direction of X axis and a direction of the image height as a direction of Y axis. Further, each piece of coordinate data in the pixel coordinate system is a coordinate of a particular pixel in the entire image, expressed in the unit of pixels. The pixel coordinate system and the image coordinate system are as shown in FIG. 4. As shown in FIG. 4, the transformation relationship between the pixel coordinate system and the image coordinate system is expressed in the formula (6):

$$u = \frac{x}{dx} + u_0, \quad v = \frac{y}{dy} + v_0 . \quad (6)$$

In the formula (6), u and v are a coordinate under the image coordinate system, dx and dy refer to actual size of a pixel on the photosensitive device, which are used to associate the pixel coordinate system with the true physical coordinate system, u0 and v0 refer to a central coordinate of the image pixel plane, and x and y refer to a coordinate under the pixel coordinate system.

4. Based on the transformation relationships of the steps 1 to 3, the transformation relationship between the pixel coordinate system and the world coordinate system is obtained, as shown in the formula (7):

$$\begin{bmatrix} x \\ y \\ 1 \end{bmatrix} = \frac{1}{Z_c} \begin{bmatrix} f_x & 0 & 0 \\ 0 & f_y & 0 \\ 0 & 0 & 1 \end{bmatrix} \begin{bmatrix} c_2 & -s_2 & 0 \\ -s_1.s_2 & s_1.c_2 & -c_1 \\ c_1.s_2 & c_1.c_s & -s_1 \end{bmatrix} \begin{bmatrix} X \\ Y \\ Z \end{bmatrix}_W . \quad (7)$$

where, $Z_C = c_1 * s_2 * X_W + c_1 * c_2 * Y_W - s_1 * Z_W$

In the formula (7), $c_1=\cos\alpha$, $s_1=\sin\alpha$, $$\alpha = \theta_1 - \frac{\pi}{2},$$

$c_2=\cos\theta_3$ and $s_2=\sin\theta_3$.

It is to be noted that, the image coordinate system and the pixel coordinate system are different only in the coordinate origin, and the transformation relationship therebetween is as shown in the formula (6). Thus, in the embodiments of the present disclosure, after the image coordinate data is obtained, it is defaulted that the pixel coordinate data is obtained.

5. The rotation of the camera is described in the step 4. When the camera can move, the transformation relationship between the pixel coordinate system and the world coordinate system can be obtained as shown in the formula (8):

$$\begin{bmatrix} x \\ y \\ 1 \end{bmatrix}_I = \frac{1}{Z_c} \begin{bmatrix} f_x & 0 & 0 \\ 0 & f_y & 0 \\ 0 & 0 & 1 \end{bmatrix} \begin{bmatrix} c_2 & -s_2 & 0 \\ -s_1.s_2 & s_1.c_2 & -c_1 \\ c_1.s_2 & c_1.c_s & -s_1 \end{bmatrix} \begin{bmatrix} X \\ Y \\ Z \end{bmatrix}_W + \begin{bmatrix} X' \\ Y' \\ Z' \end{bmatrix} . \quad (8)$$

In the formula (8), X', Y' and Z' respectively refer to translation distances of the camera, which are positive values when the camera moves along a negative direction of the corresponding coordinate axes.

It can be known that, in the above steps 1 to 5, the server can obtain the transformation relationship between the pixel coordinate system and the world coordinate system based on the formulas (7) and (8). It can be understood that, the technicians may select the formula (7) or (8) based on specific scenarios and the corresponding solution falls within the scope of protection of the present disclosure. In the subsequent embodiments, the technical solution of the embodiments will be described with the formula (7) as an example, but the formula (7) does not constitute any limitation to the present disclosure.

In the present embodiment, the server may, after obtaining the rotation angle variation in step 11, substitute the above rotation angle variation into the formula (7) to obtain an updated transformation relationship between the pixel coordinate system and the world coordinate system. It can be understood that, when the transformation relationship between the pixel coordinate system and the world coordinate system is updated, the change of the focal length of the camera is not considered. When the focal length is changed, the rotation angle variation and the focal length can be synchronously substituted into the formula (7) to obtain an updated transformation relationship between the pixel coordinate system and the world coordinate system. The above two solutions of updating the transformation relationship both fall within the scope of protection of the present disclosure.

At step 13, according to world coordinate data of a preset area and the transformation relationship, pixel coordinate data of the preset area in a current image is determined, where the preset area indicates an area preset in a preview image before the camera rotates.

Figure 5:
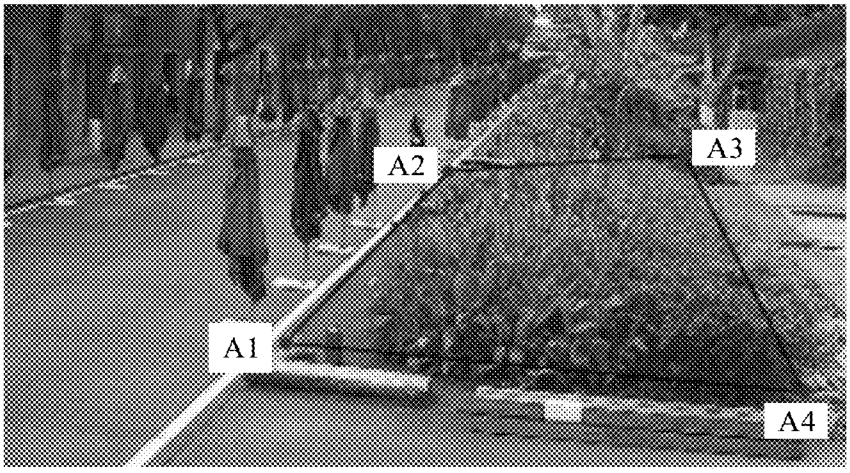
FIG. 5 is a schematic diagram illustrating an effect of setting a preset area according to an exemplary embodiment of the present disclosure.

In the present embodiment, the server may store the world coordinate data of the preset area. The above preset area is an area preset in the preview image before the camera rotates, namely, an area in which a user has special interest in the preview image, for example, the restricted area A1A2A3A4 shown in FIG. 5. It is to be noted that FIG. 5 shows a scenario of one preset area. In practical applications, the number of the preset areas may be set based on specific scenarios, for example, five preset areas may be set, which is not limited herein.

Figure 6:
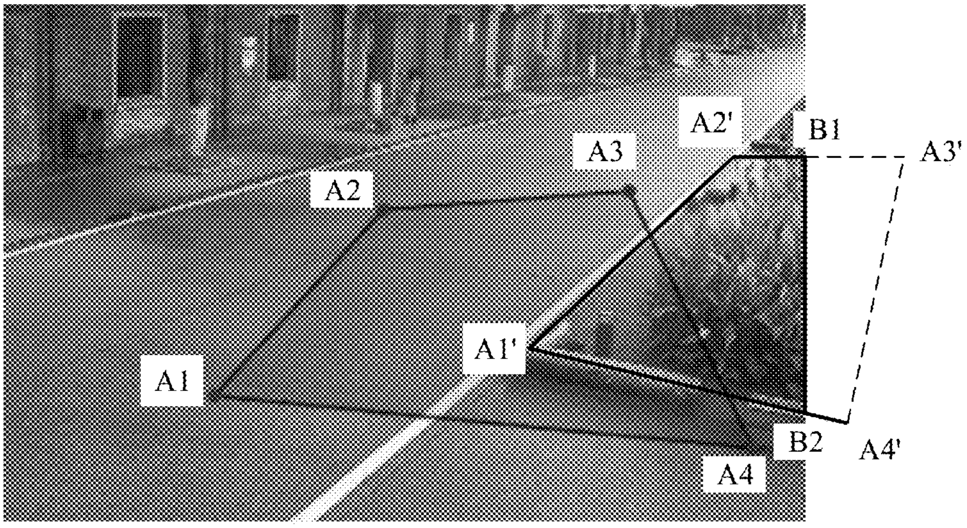
FIG. 6 is a schematic diagram illustrating an effect of a preset area after rotation of a camera according to an exemplary embodiment of the present disclosure.

It can be understood that in the practical application scenarios, the user sets the preset area by selecting pixel points in the preview image on the configuration terminal, and thus the server can obtain the pixel coordinate data of the preset area under the pixel coordinate system after the setting of the preset area is completed. When the angle of the camera is unchanged, the display effect of the preset area in the preview image is always as shown in FIG. 5. But, since the pixel coordinate data is used for setting the preset area, when the camera rotates, the contents corresponding to the pixel coordinate data are changed and the corresponding position of the preset area is also synchronously changed with the effect as shown in FIG. 6. By comparison of the preset areas in FIGS. 5 and 6, it can be found that the preset area is offset from the green belt illustrated in FIG. 5 to the road edge illustrated in FIG. 6, and the preset area A1A2A3A4 is moved to the middle of the road. In other words, the position of the preset area is changed along with the rotation of the camera.

To prevent the preset area from changing along with the rotation of the camera, since the world coordinate data of each object in different scenarios under the world coordinate system which is an absolute coordinate system does not change, the pixel coordinate data of the preset area is transformed into the world coordinate data in the embodiments of the present disclosure, namely, the preset area is transformed to be under the world coordinate system to remain unchanged. Thus, in the present embodiment, the world coordinate data of the preset area can be obtained in the following manner.

In the present embodiment, the server may obtain at least one specified point in the preview image and based on the at least one specified point, obtain the world coordinate data of the preset area. The specified point may include the origin of the world coordinate system or a first number of specified points in the preview image.

In an example, the server may establish the world coordinate system with the projection of the camera onto the horizontal plane as the origin, where a plane where the X axis and Y axis of the world coordinate system are located is parallel to the horizontal plane and the Z axis is perpendicular to the horizontal plane. After the preset area is determined, the server may sequentially display each pixel point in the preset area on the preview image and indicate the measurement personnel to perform field measurement on the world coordinate data of the preset area, and the measurement personnel uploads the world coordinate data of each pixel point to the server through the configuration terminal. In this way, the server can obtain the world coordinate data corresponding to each pixel point in the preset area, that is, obtain the world coordinate data of the preset area.

Figure 7:
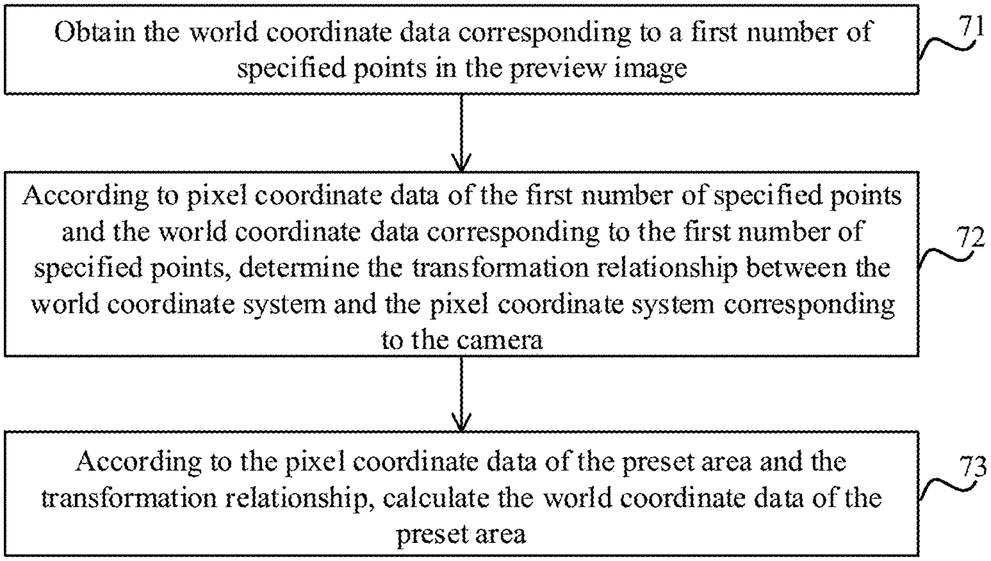
FIG. 7 is a flowchart of obtaining world coordinate data according to an exemplary embodiment of the present disclosure.

In another example, as shown in FIG. 7, at step 71, the server obtains the world coordinate data corresponding to a first number of specified points (for example, 10 specified points, adjustable) in the preview image. At step 72, the server determines a transformation relationship between the world coordinate system and the pixel coordinate system corresponding to the camera based on the pixel coordinate data of the first number of specified points and the world coordinate data corresponding to the first number of specified points, where the transformation relationship in step 72 refers to an inverse transformation of the transformation relationship between the pixel coordinate system and the world coordinate system, which can be calculated based on inverse matrix in mathematics method and will not be repeated herein. At step 73, the server calculates the world coordinate data of the preset area based on the pixel coordinate data of the preset area and the above transformation relationship. In this example, the world coordinate data of all points in the preset area can be determined by only measuring the world coordinate data of a limited number of specified points, thus reducing the measuring work and increasing the efficiency of obtaining the world coordinate data.

Figure 8:
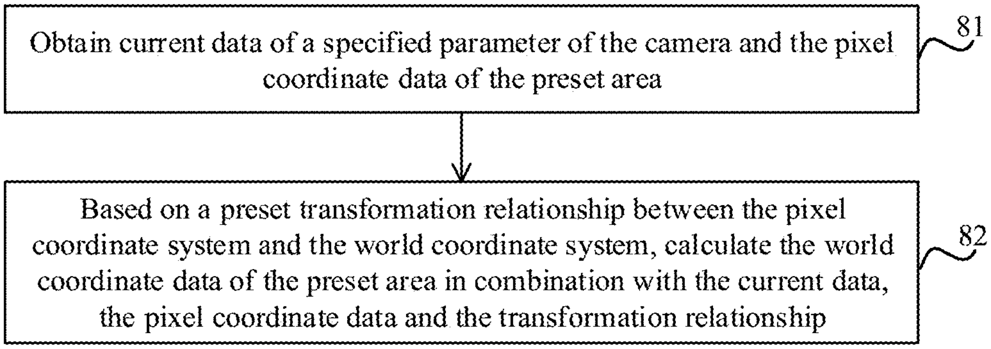
FIG. 8 is another flowchart of obtaining world coordinate data according to an exemplary embodiment of the present disclosure.

In another example, as shown in FIG. 8, at step 81, the server obtains current data of a specified parameter of the camera and the pixel coordinate data of the preset area, where the specified parameter includes at least one of: a pitch angle, a focal length, a size of a photosensitive device or a height (under the world coordinate system).

At step 82, based on a preset transformation relationship between the pixel coordinate system and the world coordinate system, the server calculates the world coordinate data of the preset area in combination with the current data, the pixel coordinate data and the transformation relationship.

Figure 9:
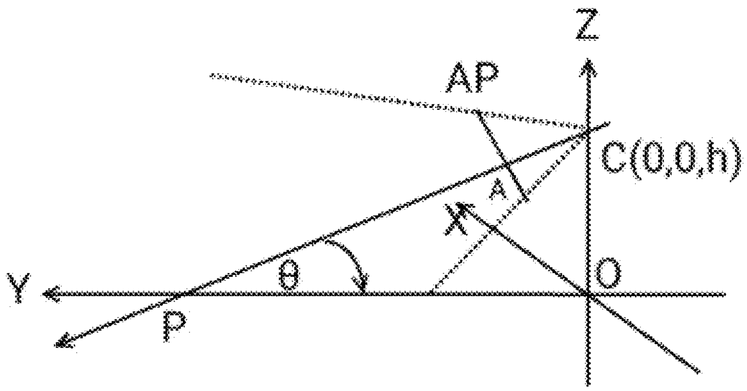
FIG. 9 is a schematic diagram illustrating a geometric relationship of obtaining world coordinate data according to an exemplary embodiment of the present disclosure.
Figure 10:
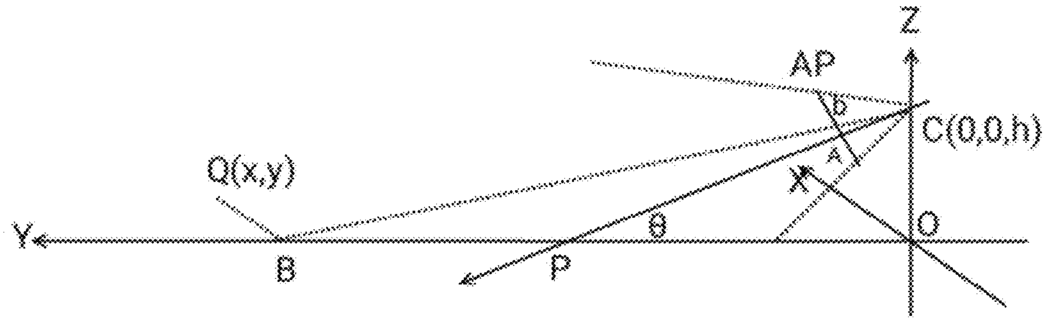
FIG. 10 is a schematic diagram illustrating another geometric relationship of obtaining world coordinate data according to an exemplary embodiment of the present disclosure.
Figure 11:
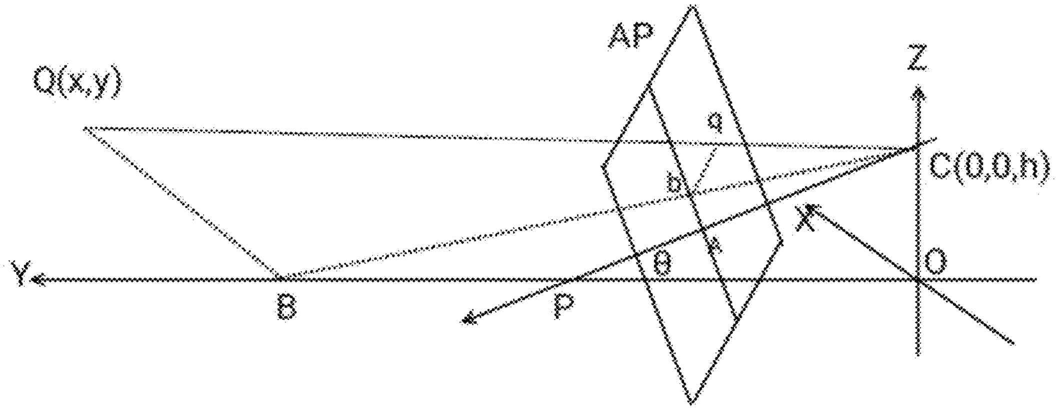
FIG. 11 is a schematic diagram illustrating another geometric relationship of obtaining world coordinate data according to an exemplary embodiment of the present disclosure.

With reference to FIGS. 9, 10 and 11, the server may obtain the pitch angle and the focal length, the size of the photosensitive device and the height of the camera. The X axis and the Y axis are located on the ground plane and the Z axis is perpendicular to the ground plane. The Y axis direction represents a visual direction and the X axis positive direction points to the paper surface. The camera is mounted at the position C of the OZ axis, with a height h from the ground plane. The optical axis CP of the camera is located on the YOZ plane, with the pitch angle of the optical axis being 0. Along the optical axis CP, the point A which is f (a focal length) away from the point C is defined as a center of the image plane AP. The included angle between two dotted lines as shown is a longitudinal view angle of the camera, defined as 2α.

For any point Q (x, y) on the XOY plane, its corresponding point on the Y axis is point B which corresponds to the pixel point b. Further, according to the geometric relationship, ∠CBO=θ−∠BCP, and tan(∠BCP)=t/f. It is noted that t is a coordinate (dimensioned) under the image coordinate system and f is the focal length. Thus, in the world coordinate data of the point Q, the y coordinate can be calculated in the formula (9):

$$y = h * c\tan(\angle CBO) = h * c\tan(\theta - \angle BCP) = h * \left[1 + \tan(\theta) * t/f\right] / \left[\tan(\theta) - t/f\right]. \tag{9}$$

With reference to FIG. 10, the image bq of the line segment BQ on the XOY plane is shown: based on the geometric relationship, the formulas (10), (11) and (12) can be obtained.

$$Cb = \sqrt{Ab^2 + CA^2} = \sqrt{t^2 + f^2} \tag{10}$$

$$\tan(\angle qbc) = \frac{qb}{Cb} = \frac{s}{\sqrt{t^2 + f_2}} \tag{11}$$

$$X = QB = \sqrt{h^2 + Y^2} * \tan(\angle qbC) = \sqrt{h^2 + Y^2} * \frac{s}{\sqrt{t^2 + f_2}} \tag{12}$$

In this way, the server may, based on the angle/height and focal length information of the camera, calculate the world coordinate data of the point b in the image. If the point b is a pixel point in the preset area, the world coordinate data corresponding to each pixel in the preset area can be obtained. Thus, in the present embodiment, the world coordinate data can be calculated by only obtaining partial mounting data of the camera, eliminating the need of human measurement and increasing the efficiency of obtaining the world coordinate data.

Figure 12:
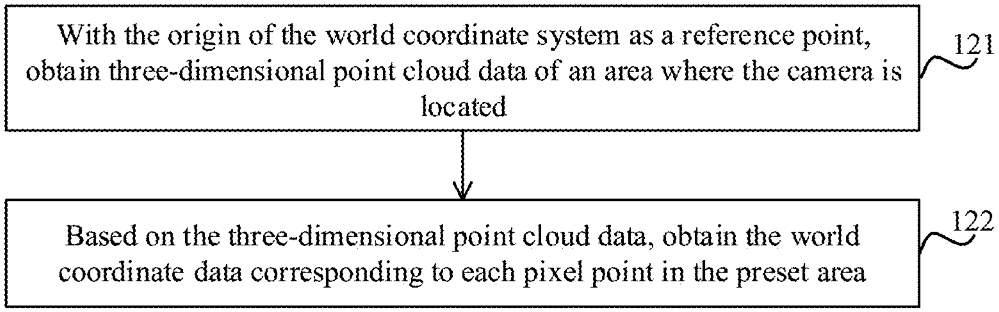
FIG. 12 is another flowchart of obtaining world coordinate data according to an exemplary embodiment of the present disclosure.

In another example, as shown in FIG. 12, at step 121, the server obtains three-dimensional point cloud data of an area where the camera is located, with the origin of the world coordinate system as a reference point, where the three-dimensional point cloud data may be obtained by laser radar or depth camera or the like. At step 122, the server obtains the world coordinate data corresponding to each pixel point in the preset area based on the three-dimensional point cloud data. It can be understood that, since the point cloud data is collected in a case where the origin of the world coordinate system is the projection point of the camera, the distances in the point cloud data are the world coordinate data. If the coordinate origin of the world coordinate system is changed, the world coordinate data of the preset area can be calculated based on the contents shown in FIGS. 9 to 11.

It is to be noted that, in the present embodiment, only above several solutions for obtaining the world coordinate data of the preset area are shown. The several solutions can be used separately or in case of no conflicts, used by combination. The combined solutions still fall within the scope of protection of the present disclosure.

In the present embodiment, after the world coordinate data of the preset area and the transformation relationship between the pixel coordinate system and the world coordinate system are obtained, the server may, based on the world coordinate data of the preset area and the transformation relationship, determine the pixel coordinate data of the preset area in the current image.

In an embodiment, the server may, after obtaining the pixel coordinate data of the preset area in the current image, send the pixel coordinate data to a webpage configuration end such that the webpage configuration end can update the pixel coordinate data of the preset area. The above webpage configuration end may be a security application program installed in the server, or a security application program installed at the configuration terminal, or a configuration terminal, which can be set based on specific application scenarios. In a subsequent displaying process, the display device or the configuration terminal of the security system may display the above preset area in the current image, and along with adjustment of the current preview image, the "frame" of the preset area can be presented, with the display effect as shown by the area A1' A2 A3 A4' in FIG. 6. After the camera rotates, the preset area may be partially or wholly moved out of the current image. For example, when the preset area is partially moved out, an unmoved part may be displayed in the current image, with the effect as the A1' A2' B1B2 in FIG. 6, where B1 and B2 are points where the preset area intersects with the edge of the current image, and the area B1B2A4'A3' is a part moving out of the current image. In practical applications, in addition to displaying the preset area A1'A2 B1B2 in the current preview image, the area B1B2A4 A3' moved out of the display area can also be displayed by dotted line, or the area A1A2A3A4 is displayed when the preset area is moved wholly out of the display area, so as to help the user to determine the position of the preset area. Furthermore, when the user clicks on the preset area, the camera can automatically rotate until the current image displays the preset area.

In this case, in the present embodiment, the pixel coordinate data of the preset area can be automatically updated to achieve the effect of updating the pixel coordinate data of the preset area along with the rotation of the camera, eliminating the need for manual correction for the preset area, and improving the accuracy of the identification result.

In the solutions provided by the embodiments of the present disclosure, after it is detected that a camera rotates, a rotation angle variation of the camera is obtained; then, according to the rotation angle variation, a transformation relationship between a world coordinate system and a pixel coordinate system corresponding to the camera is obtained; next, according to world coordinate data of a preset area and the transformation relationship, pixel coordinate data of the preset area in the current picture is determined, where the preset area is an area preset in a preview image before the camera rotates. In this case, in the present embodiments, the preset area in the preview image does not change along with the rotation of the camera. Thus, no false identifications and false alarms will be generated during a process of identifying an object in the preset area subsequently, helping improve the identification efficiency and the use experiences.

Figure 13:
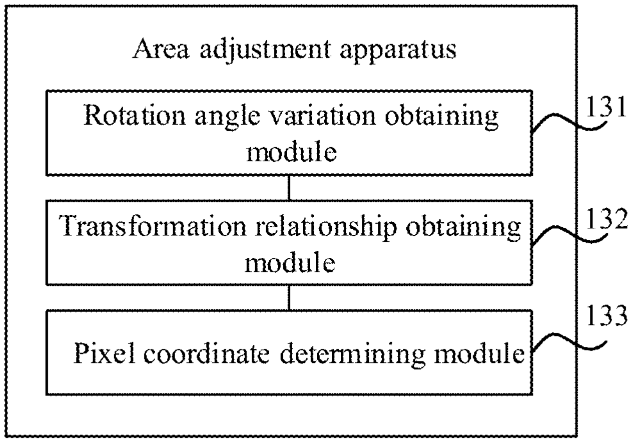
FIG. 13 is a block diagram illustrating an area adjustment apparatus according to an exemplary embodiment of the present disclosure.

An embodiment of the present disclosure provides an area adjustment apparatus on the basis of providing the area adjustment method in the above embodiments of the present disclosure. As shown in FIG. 13, the apparatus includes:

- a rotation angle variation obtaining module 131, configured to, in response to detecting that a camera rotates, obtain a rotation angle variation of the camera;
- a transformation relationship obtaining module 132, configured to, according to the rotation angle variation, obtain a transformation relationship between a world coordinate system and a pixel coordinate system corresponding to the camera;

a pixel coordinate determining module 133, configured to, according to world coordinate data of a preset area and the transformation relationship, determine pixel coordinate data of the preset area in a current image: where the preset area indicates an area preset in a preview image before the camera rotates.

In an embodiment, the transformation relationship obtaining module includes:

a camera coordinate system obtaining unit, configured to, according to the rotation angle variation, obtain a camera coordinate system corresponding to the camera;

a transformation relationship obtaining unit, configured to, according to the camera coordinate system, obtain the transformation relationship between the world coordinate system and the pixel coordinate system corresponding to the camera.

In an embodiment, the apparatus further includes a world coordinate obtaining module, which includes:

a world coordinate obtaining unit, configured to, establish the world coordinate system with a projection of the camera onto a horizontal plane as the origin, and obtain the world coordinate data corresponding to each pixel point in the preset area to obtain the world coordinate data of the preset area.

In an embodiment, the apparatus further includes a world coordinate obtaining module, which includes:

a coordinate data obtaining unit, configured to obtain the world coordinate data corresponding to a first number of specified points in the preview image;

a transformation relationship obtaining unit, configured to, according to pixel coordinate data of the first number of specified points and the world coordinate data corresponding to the first number of specified points, determine the transformation relationship between the world coordinate system and the pixel coordinate system corresponding to the camera;

a world coordinate obtaining unit, configured to, according to the pixel coordinate data of the preset area and the transformation relationship, calculate the world coordinate data of the preset area.

In an embodiment, the apparatus further includes a world coordinate obtaining module, which includes:

a pixel coordinate obtaining unit, configured to obtain current data of a specified parameter of the camera and the pixel coordinate data of the preset area, where the specific parameter includes at least one of: a pitch angle, a focal length, a size of a photosensitive device or a height;

a world coordinate obtaining unit, configured to, according to a preset transformation relationship between the pixel coordinate system and the world coordinate system, obtain the world coordinate data of the preset area in combination with the current data, the pixel coordinate data and the transformation relationship.

In an embodiment, the apparatus further includes a world coordinate obtaining module, which includes:

a point cloud data obtaining unit, configured to, with an origin of the world coordinate system as a reference point, obtain three-dimensional point cloud data of an area where the camera is located;

a world coordinate obtaining unit, configured to, based on the three-dimensional point cloud data, obtain the world coordinate data corresponding to each pixel point in the preset area.

In an embodiment, the apparatus further includes:

a pixel coordinate configuring module, configured to send the pixel coordinate data of the preset area in the current image to a webpage configuration end, such that the webpage configuration end updates the pixel coordinate data of the preset area.

It is noted that the apparatus shown in the present embodiment is matched with the contents of the method embodiments and can be referred to the contents of the method embodiments and thus will not be repeated herein.

In an exemplary embodiment, there is further provides a camera, including:

a processor;

a memory, configured to store a computer program executable by the processor;

where the processor is configured to execute the computer program in the memory to perform the method as described in FIGS. 1 to 12.

Figure 14:
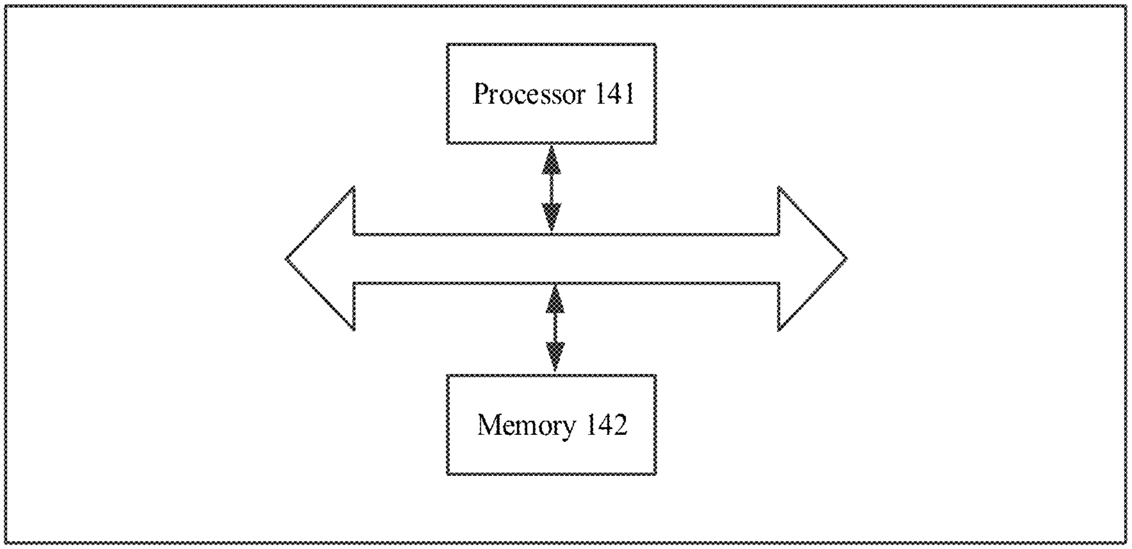
FIG. 14 is a block diagram illustrating a server according to an exemplary embodiment of the present disclosure.

In an exemplary embodiment, there is further provided a security system, including at least one camera and a server, where the camera is used to collect and send an image to the server. As shown in FIG. 14, the server includes:

a processor 141;

a memory 142, configured to store a computer program executable by the processor;

where the processor is configured to execute the computer program in the memory to perform the method as described in FIGS. 1 to 12.

In an exemplary embodiment, there is further provided a computer readable storage medium, for example, a memory including an executable computer program, where the above executable computer program may be executed by a processor to perform the method in the embodiments shown in FIG. 1. The readable storage medium may be a Read Only Memory (ROM), an Random Access Memory (RAM), a CD-ROM, a magnetic tape, a floppy disk, and an optical data storage device or the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. An area adjustment method, comprising:

in response to detecting that a camera rotates, obtaining a rotation angle variation of the camera;

according to the rotation angle variation, updating a transformation relationship between a world coordinate system and a pixel coordinate system corresponding to the camera to obtain an updated transformation relationship between the world coordinate system and the pixel coordinate system; and according to world coordinate data of a preset area and the updated transformation relationship between the world coordinate system the pixel coordinate system, determining pixel coordinate data of the preset area in a current image; wherein the preset area indicates an area preset in a preview image before the camera rotates.

2. The method of claim 1, wherein according to the rotation angle variation, updating the transformation relationship between the world coordinate system and the pixel coordinate system corresponding to the camera to obtain the updated transformation relationship between the world coordinate system and the pixel coordinate system comprises:

substituting the rotation angle variation into a formula corresponding the transformation relationship between the world coordinate system and the pixel coordinate system corresponding to the camera to obtain the updated transformation relationship between the world coordinate system and the pixel coordinate system.

3. The method of claim 1, further comprising:

obtaining the world coordinate data of the preset area, so as to obtain the pixel coordinate data according to the world coordinate data.

4. The method of claim 3, wherein obtaining the world coordinate data of the preset area comprises:

obtaining at least one specified point in the preview image; and based on the at least one specified point, obtaining the world coordinate data of the preset area.

5. The method of claim 4, wherein in response to determining that the at least one specified point is an origin of the world coordinate system, obtaining the world coordinate data of the preset area based on the at least one specified point comprises:

establishing the world coordinate system with a projection of the camera onto a horizontal plane as the origin, and obtaining the world coordinate data corresponding to each pixel point in the preset area, so as to obtain the world coordinate data of the preset area.

6. The method of claim 4, wherein in response to determining that the at least one specified point is a first number of specified points in the preview image, obtaining the world coordinate data of the preset area based on the at least one specified point comprises:

obtaining the world coordinate data corresponding to the first number of specified points in the preview image;

according to pixel coordinate data of the first number of specified points and the world coordinate data corresponding to the first number of specified points, determining the transformation relationship between the world coordinate system and the pixel coordinate system corresponding to the camera; and according to the pixel coordinate data of the preset area and the transformation relationship, calculating the world coordinate data of the preset area.

7. The method of claim 3, wherein obtaining the world coordinate data of the preset area comprises:

obtaining current data of a specified parameter of the camera and the pixel coordinate data of the preset area; wherein the specified parameter comprises at least one of: a pitch angle, a focal length, a size of a photosensitive device or a height; and based on a preset transformation relationship between the pixel coordinate system and the world coordinate system, calculating the world coordinate data of the preset area in combination with the current data, the pixel coordinate data and the transformation relationship.

8. The method of claim 3, wherein obtaining the world coordinate data of the preset area comprises:

with an origin of the world coordinate system as a reference point, obtaining three-dimensional point cloud data of an area where the camera is located; and based on the three-dimensional point cloud data, obtaining the world coordinate data corresponding to each pixel point in the preset area.

9. The method of claim 1, further comprising:

sending the pixel coordinate data of the preset area in the current image to a webpage configuration end, such that the webpage configuration end updates the pixel coordinate data of the preset area.

10. A camera, comprising:

a processor;

a memory, configured to store a computer program executable by the processor;

wherein the processor is configured to execute the computer program in the memory to perform the method of claim 1.

11. A security system, comprising at least one camera and a server, wherein the camera is configured to collect and send an image to the server; and the server comprises:

a processor;

a memory, configured to store a computer program executable by the processor;

wherein the processor is configured to execute the computer program in the memory to perform the method of claim 1.

12. A non-transitory computer readable storage medium, wherein an executable computer program in the storage medium is executed by a processor to perform the method of claim 1.

* * * * *